US012457444B2

(12) United States Patent
Zhou

(10) Patent No.: US 12,457,444 B2
(45) **Date of Patent: *Oct. 28, 2025**

(54) DUAL-CONE SMALL LOUDSPEAKER

(71) Applicant: SUZHOU SONAVOX ELECTRONICS CO., LTD., Suzhou (CN)

(72) Inventor: Jianming Zhou, Suzhou (CN)

( * ) Notice: Subject to any disclaimer, the term of this patent is extended or adjusted under 35 U.S.C. 154(b) by 352 days.

This patent is subject to a terminal disclaimer.

(21) Appl. No.: 18/024,273

(22) PCT Filed: Oct. 8, 2021

(86) PCT No.: PCT/CN2021/122625

§ 371 (c)(1),
(2) Date: Jun. 21, 2023

(87) PCT Pub. No.: WO2022/048692

PCT Pub. Date: Mar. 10, 2022

(65) Prior Publication Data

US 2024/0298106 A1 Sep. 5, 2024

(30) Foreign Application Priority Data

Sep. 2, 2020 (CN) ......................... 202021893296.1

(51) Int. Cl.

| | |
|---|---|
| ***H04R 1/24*** | (2006.01) |
| ***H04R 1/06*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ................ *H04R 1/24* (2013.01); *H04R 1/06* (2013.01); *H04R 7/122* (2013.01); *H04R 7/127* (2013.01); *H04R 7/18* (2013.01); *H04R 9/025* (2013.01); *H04R 9/045* (2013.01); *H04R 9/046* (2013.01); *H04R 9/06* (2013.01); *H04R 2400/11* (2013.01)

(58) Field of Classification Search
CPC .... H04R 9/063; H04R 9/025; H04R 2207/02; H04R 7/06; H04R 7/18
See application file for complete search history.

(56) References Cited

FOREIGN PATENT DOCUMENTS

| | | | |
|---|---|---|---|
| CN | 202127507 U | * | 1/2012 |
| CN | 208798193 U | | 4/2019 |
| CN | 208798205 U | | 4/2019 |

(Continued)

*Primary Examiner* — Sunita Joshi
(74) *Attorney, Agent, or Firm* — SOROKER AGMON NORDMAN

(57) ABSTRACT

Disclosed is a dual-cone loudspeaker, including: a frame; a cone assembly arranged on the frame and including a central cone and an outer cone; a central driving mechanism for driving the central cone to vibrate; and a plurality of outer driving mechanisms for driving the outer cone to vibrate. The outer driving mechanisms are arranged around the central driving mechanism. The central driving mechanism includes a central voice coil connected to the central cone, and a central magnetic driving system for driving the central voice coil. Each of the plurality of outer driving mechanisms includes an outer voice coil connected to the outer cone, and an outer magnetic driving system for driving the outer voice coil.

13 Claims, 3 Drawing Sheets

(56) References Cited

FOREIGN PATENT DOCUMENTS

| | | | |
|---|---|---|---|
| CN | 110225440 | A | 9/2019 |
| CN | 110248297 | A | 9/2019 |
| CN | 212231725 | U | 12/2020 |
| CN | 212259322 | U | 12/2020 |
| CN | 212752626 | U | 3/2021 |
| CN | 212936188 | | 4/2021 |

* cited by examiner

DUAL-CONE SMALL LOUDSPEAKER

The present disclosure claims the priority from Chinese Patent Application No. CN 2020218932961.

FIELD OF TECHNOLOGY

The present disclosure belongs to the field of the loudspeaker, and relates to a dual-cone small loudspeaker, and in particular to a dual-cone multi-channel audio inputting signal-driven small loudspeaker with no damper.

BACKGROUND

The cone adopted by the existing traditional small loudspeakers with no damper is generally disc-shaped, and is connected to a voice coil to form a loudspeaker vibration system with no damper. This type of loudspeaker with no damper can only be applied to single-channel signal input, however, single-channel audio signal input has limitations for sound reproduction, and when a single voice coil is combined with a cone, there is a high requirement for the rigidity of the cone. Although the voice coil of this type of loudspeaker can also adopt a multi-channel signal inputting voice coil, such voice coil is formed by multiple sets of coils stacked from inside to outside, the disc-shaped cone and the damper are respectively glued to an outer wall of the voice coil to form a vibration system of the loudspeaker, and this type of loudspeaker can be applied to multiple signal inputs. However, due to the fact that such loudspeaker has one voice wounded by multiple groups of coils, and the multiple groups of coils wound into one voice coil increases the weight of the voice coil, the sensitivity of the loudspeaker may be affected and may decrease when the voice coil drives the cone. Although it is reported that multiple magnetic driving systems are used to drive multiple voice coils respectively, the sound reproduction clarity of the loudspeaker needs to be improved.

SUMMARY

The present disclosure relates to a dual-cone small loudspeaker with no damper, which improves the sound reproduction clarity and has high sensitivity.

A dual-cone loudspeaker comprises a frame and a cone assembly arranged on the frame, the cone assembly comprises a central cone and an outer cone, the small loudspeaker further comprises a central driving mechanism for driving the central cone to vibrate, and a plurality of outer driving mechanisms for driving the outer cone to vibrate, the outer driving mechanisms are arranged around the central driving mechanism, the central driving mechanism comprises a central voice coil connected to the central cone, and a central magnetic driving system for driving the central voice coil, and each of the plurality of outer driving mechanisms comprises an outer voice coil connected to the outer cone, and an outer magnetic driving system for driving the corresponding outer voice coil.

In some embodiments, the frame comprises a frame bottom, and an inner flange extending upwards from the frame bottom, and an outer edge of the central cone is fixedly connected to the inner flange.

In some embodiments, the frame further comprises an outer part extending upwards from the frame bottom, the outer part surrounds the outer periphery of the inner flange, the outer cone is in a ring shape with an inner edge and an outer edge, the inner edge of the outer cone is fixedly connected to the inner flange, and the outer edge of the outer cone is fixedly connected to the outer part.

In some embodiments, the frame further comprises a frame bottom, an inner flange and a outer part extending upwards from the frame bottom, the outer part surrounds the outer periphery of the inner flange, an outer edge of the central cone is fixedly connected to the inner flange, the outer cone is in a ring shape with an inner edge and an outer edge, the inner edge of the outer cone is fixedly connected to the inner flange, and the outer edge of the outer cone is fixedly connected to the outer part.

In some embodiments, the central magnetic driving system and the outer magnetic driving systems are fixedly arranged on the frame bottom, and the central voice coil and the outer voice coils are located between the cone assembly and the frame bottom.

In some embodiments, the central magnetic driving system and the outer magnetic driving systems are fixedly arranged below the frame bottom, the frame bottom is opened with a central through-hole and a plurality of peripheral through-holes, a lower end of the central voice coil is inserted into a magnetic gap of the central magnetic driving system through the central through hole, and a lower end of the outer voice coil is inserted into a magnetic gap of one of the outer magnetic driving systems through one of the peripheral through-holes.

In some embodiments, the frame bottom is substantially in a shape of flat plate.

In some embodiments, each of the central magnetic driving system and the outer magnetic driving systems comprises a U-yoke having a cavity, and a magnetic steel and a magnetic pole core arranged within the U-yoke, an upper end of the U-yoke is fixedly connected to the frame bottom, and a magnetic gap into which the central voice coil or one of the outer voice coils is inserted is formed between the magnetic steel and the magnetic pole core and an inner wall of the U-yoke.

In some embodiments, each of the central voice coil and the outer voice coils has a pair of leads, an end portion of each of the leads is connected with one inputting terminal that is capable of being electrically connected to a power amplifier, and the inputting terminal is embedded on a lower surface of the frame bottom. Further, an outer surface of the outer part is provided with a plurality of outlet slots respectively corresponding to the inputting terminals.

In some embodiments, a central cone and the outer cone have flat plate-shaped main bodies, respectively. Optionally, the central part of the central cone has an upward arched spherical dome, and the outer cone has a flat plate-shaped main body.

In some embodiments, when viewing from the top, the central cone is circular, and the outer cone is a ring surrounding the central cone.

In some embodiments, a fixing step is formed on a lower surface of the central cone to connect to the central voice coil; and/or, a plurality of fixing steps are formed on a lower surface of the outer cone to connect to the outer voice coils.

In some embodiments, the plurality of outer driving mechanisms are arranged around the central driving mechanism at equal intervals.

In some embodiments, the small loudspeaker does not comprise any damper.

The small loudspeaker of the present disclosure has an ingenious and reasonable product structure, the central cone is promoted to sound by inputting an audio signal to the central voice coil to vibrate up and down in the central magnetic driving system, and the plurality of outer cones is promoted to sound by inputting multi-channel audio signals respectively to the plurality of outer voice coils to vibrate up and down in the outer magnetic driving systems, the central cone emits a midrange and treble sound, and the outer cones increase and expand the bass performance of the loudspeaker, broadens the frequency bandwidth and directivity of the loudspeaker, and reduces the distortion of the loudspeaker; through the combination of the central voice coil and the plurality of outer voice coils, and through driving the two cones by the central magnetic driving system and the outer magnetic driving systems, the sensitivity of the loudspeaker is increased; by inputting multi-channel audio signals into the central voice coil and the outer voice coils respectively, the central cone and the outer cones are promoted, which can improve the sound reproduction effect of the loudspeaker.

BRIEF DESCRIPTION OF DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

REFERENCE NUMBERS

1—frame; 11—frame bottom; 111—central through-hole; 112—peripheral through-hole; 12—outer part; 121—outlet slot; 13—inner flange;

2. cone assembly; 21—central cone; 211—spherical dome; 22—outer cone; 221—edge ring;

31—central voice coil; 32—outer voice coil; 33—lead; 34—inputting terminal;

**4*a*—central magnetic driving system; 4*b*—outer magnetic driving system; 41—U-yoke; 42—magnet; 43**—magnetic pole core.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

As shown in the specification and the claims, the terms "comprising" and "containing" only indicate that the clearly identified steps and elements are included, and these steps and elements do not constitute an exclusive list, and the method or device may also include other steps or elements. The term "and/or" as used herein includes any combination of one or more of the associated listed items.

In the description of the present application, it should be understood that the orientations or positional relationships indicated by the terms "center", "periphery", "upper", "lower", "left", "right", "vertical", "horizontal", "top", "bottom", "inner" and "outer", etc. are based on those shown in the accompanying drawings, are only for the convenience of describing the present application and simplifying the description, rather than indicating or implying that the indicated device(s) or element(s) must have a specific orientation, be constructed and operated in a specific orientation, and therefore should not be construed as a limitation of the present application.

In the description herein, it should be noted, unless otherwise expressly specified and limited, the terms "mount", "communicate" and "connect" and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the art, the specific meanings of the above terms in the present disclosure can be understood according to specific situations. On the contrary, when an element is referred to as "directly on" another element, there is no intermediate medium.

Figure 1:
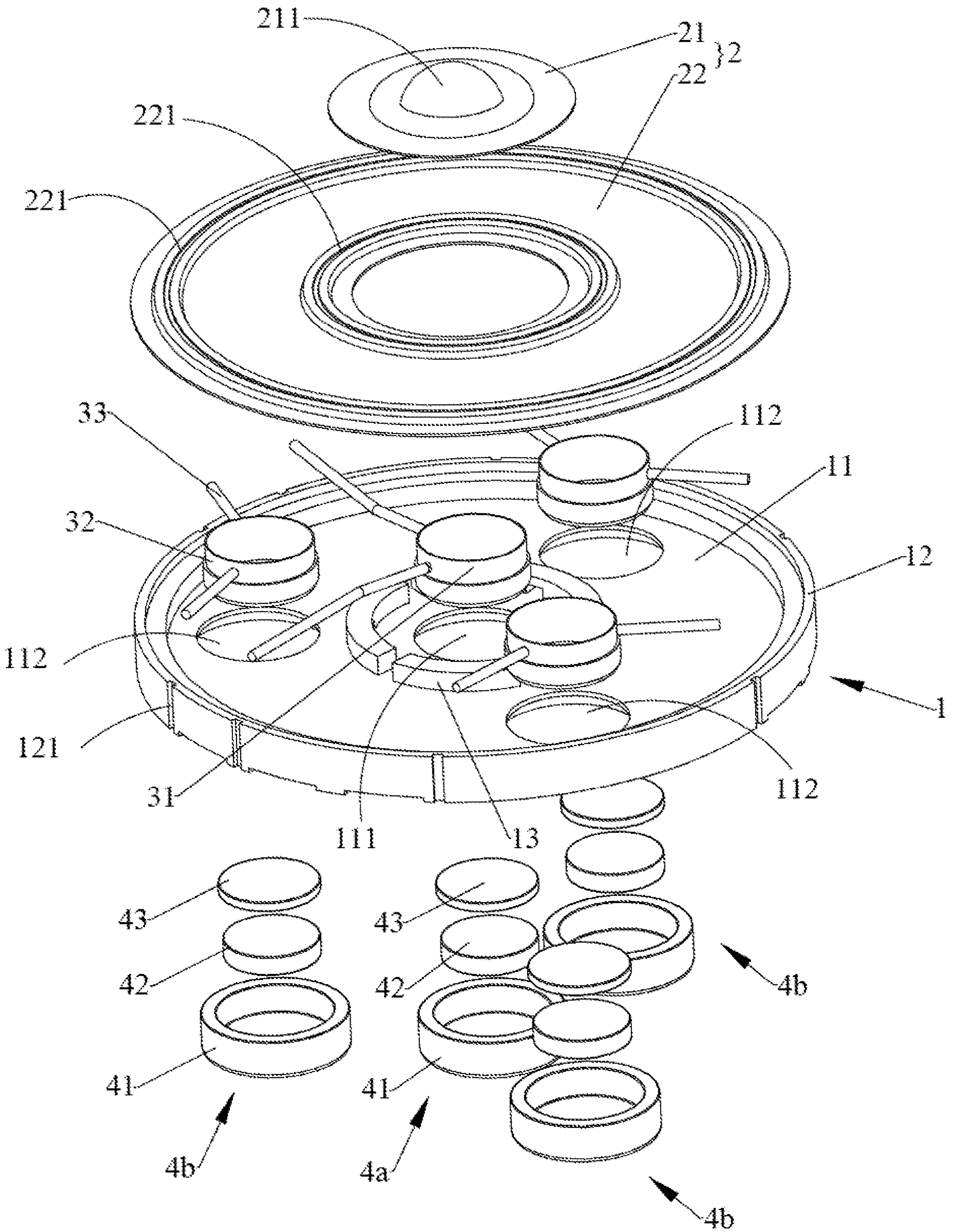
FIG. 1 is a schematic exploded view of a small loudspeaker according to an embodiment of the present disclosure.
Figure 2:
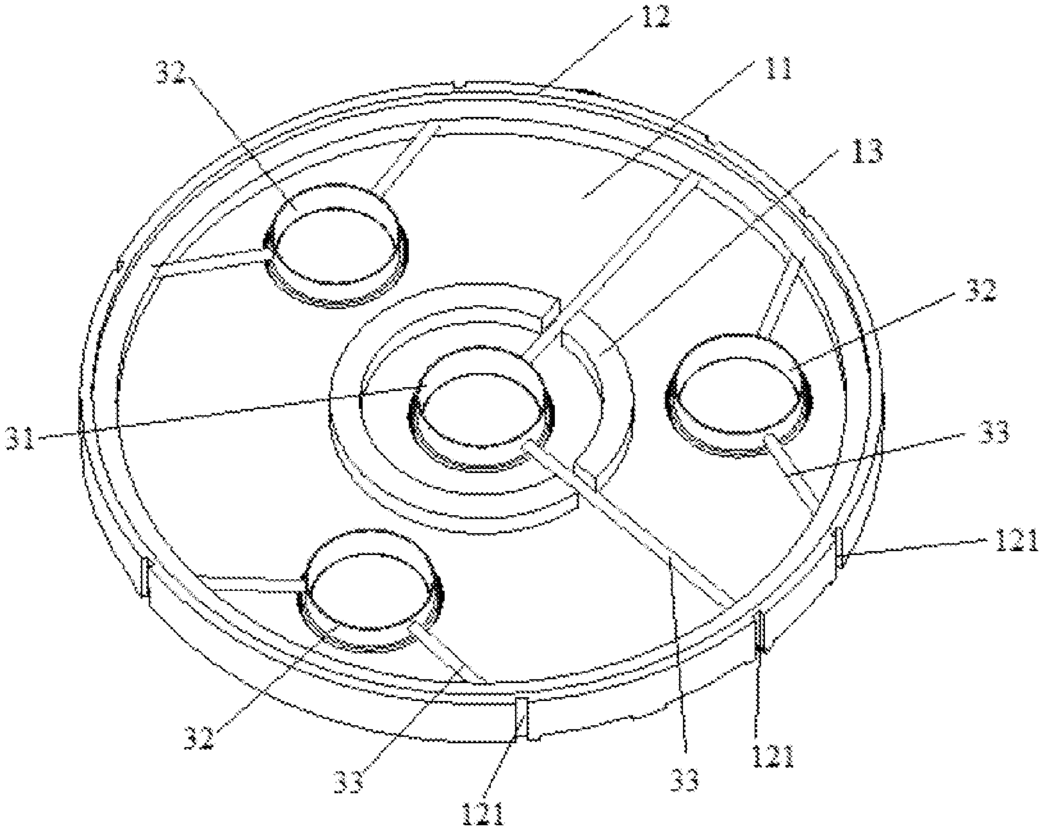
FIG. 2 is a schematic front view of the frame in FIG. 1 with the voice coils mounted thereon.
Figure 3:
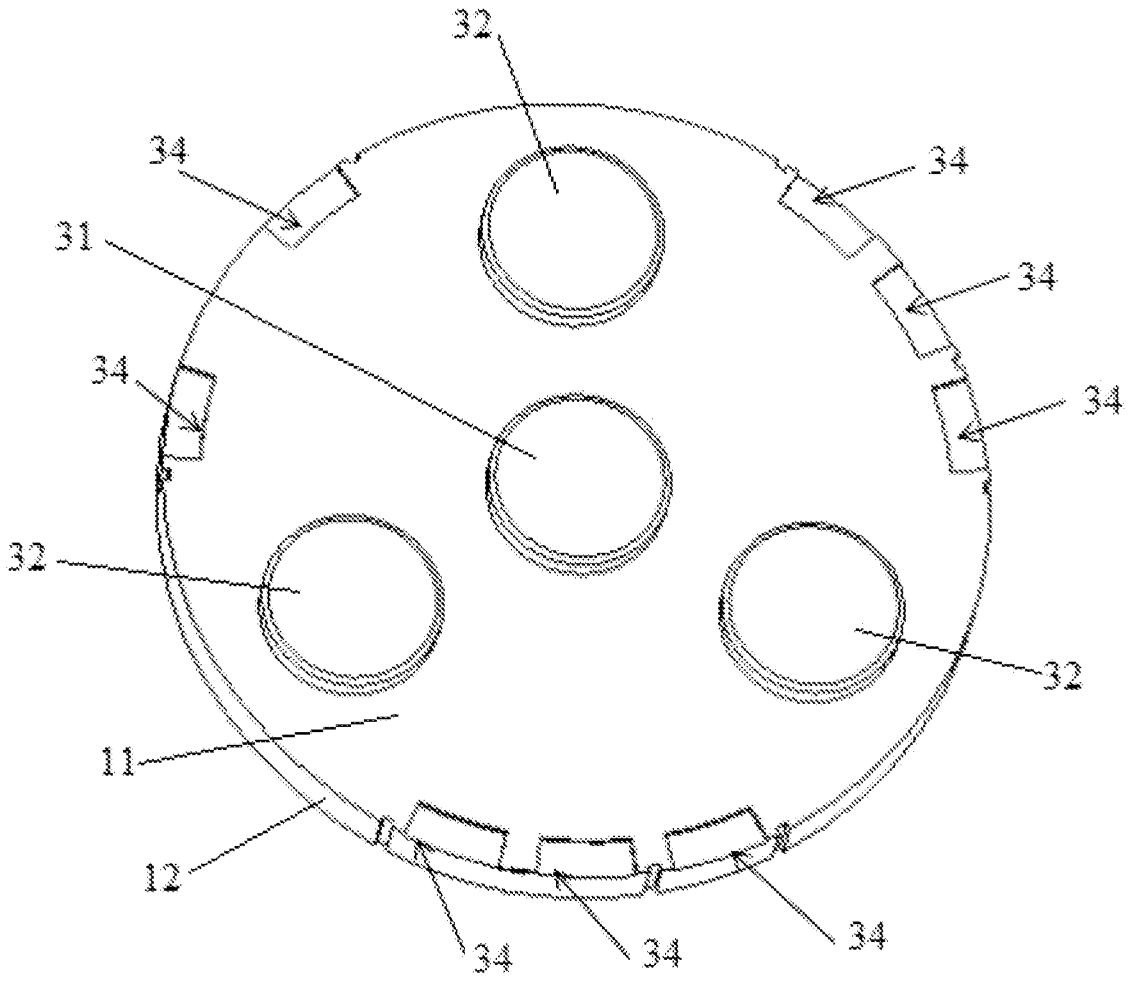
FIG. 3 is a schematic back view of the frame in FIG. 1 with the voice coils mounted thereon.

This embodiment provides a dual-cone loudspeaker, specifically a small loudspeaker with no damper. Referring to FIG. 1 to FIG. 3, the dual-cone small loudspeaker comprises a frame 1 and a cone assembly 2 arranged on the frame 1. The cone assembly 2 comprises a central cone 21 and an outer cone 22, the outer cone 22 surrounds the central cone 21, and the two are independently arranged on the frame 1 and do not overlap each other. Preferably, the central cone 21 and the outer cone 22 respectively have flat plate-shaped main bodies, and reinforcing ribs are arranged on the back of the main bodies of the two to improve the working strength and rigidity, which is used to enhance the strength of the voice coil as it pushes the cones. The height of the central cone 21 and the outer cone 22 is lower than the height of the traditional disc-shaped cone, and at the same time, when the central cone 21 and the outer cone 22 adopt the flat-plate shape, the product directivity width is better than that of the loudspeaker with a traditional disc-shaped cone. In addition, the central portion of the central cone 21 has an upward arched spherical dome, increasing treble frequency extension. The outer cone 22 is a ring with an inner edge and an outer edge, the inner edge of the outer cone 22 is fixedly connected to the central cone 21, and the outer edge of the outer cone 22 is fixedly connected to the frame 1 through the edge ring 221. When viewing from the top, the central cone 21 is circular, and the outer cone 22 is a ring surrounding the central cone 21.

Referring to FIG. 1, the small loudspeaker further comprises a central driving mechanism for driving the central cone 21 to vibrate, and a plurality of outer driving mechanisms for driving the outer cone 22 to vibrate, the outer driving mechanisms are arranged around the periphery of the central driving mechanism. Further, the plurality of outer driving mechanisms is arranged around the central driving mechanism at equal intervals. The central driving mechanism comprises a central voice coil 31 connected to the central cone 21, and a central magnetic driving system **4*a* for driving the central voice coil 31, and each outer driving mechanism comprises an outer voice coil 32 connected to the outer cone 22, and an outer magnetic driving system 4*b* for driving the corresponding outer voice coil 32. Preferably, the number of the outer voice coils 32 is three or more, and are arranged in a circle at equal intervals, the center of the circle falls on the midpoint of the central voice coil 31. The central cone 21 is driven by the central voice coil 31 to vibrate and sound, and the central cone 21 undertakes medium and high-frequency sound production. The outer cone 22 is driven by the three or more outer voice coils 32 together to vibrate and sound, and the outer cone 22 undertakes low and medium-frequency sound production. The plurality of outer voice coils 32** can input multi-channel different analog or digital audio signals, which improves the sound reproduction performance of the loudspeaker.

Referring to FIG. 1 and FIG. 2, the frame 1 comprises a frame bottom 1, an outer part 12 and an inner flange 13 extending upward from the frame bottom 1, the outer part 12 extends from the outer edge of the frame bottom 1, the inner flange 13 extends from the middle of the frame bottom 1, and the two are substantially concentric rings. The outer edge of the central cone 21 is fixedly connected to the inner flange 13. The outer cone 22 is a ring with an inner edge and an outer edge, the inner edge of the outer cone 22 is fixedly connected to the central cone 21 through an edge ring 221, and the outer edge of the outer cone 22 is fixedly connected to the frame 1 through the edge ring 221. And the outer edge of the central cone 21 and the inner edge of the outer cone 22 are preferably not connected to each other. The central magnetic driving system 4*a* and the outer magnetic driving systems 4*b* are fixedly arranged on the frame bottom 11, and the central voice coil 31 and the outer voice coils 32 are located between the cone assembly 2 and the frame bottom 11. Preferably, the central magnetic driving system 4*a* and the outer magnetic driving systems 4*b* are fixedly arranged below the frame bottom 11, the frame bottom 11 is opened with a central through-hole 111 and a plurality of peripheral through-holes 112, a lower end of the central voice coil 31 is inserted into a magnetic gap of the central magnetic driving system 4*a* through the central through hole 111, and lower ends of the respective outer voice coils 32 are inserted into magnetic gaps of the outer magnetic driving systems 4*b* through the corresponding peripheral through-holes 112.

Referring to FIG. 1, each of the central magnetic driving system 4*a* and the outer magnetic driving systems 4*b* comprises a U-yoke 41 having a cavity, and a magnetic steel 42 and a magnetic pole core 43 arranged within the U-yoke 41, an upper end of the U-yoke 41 is fixedly connected to the frame bottom 11, and a magnetic gap into which the central voice coil 31 or one of the outer voice coils 32 is inserted is formed between the magnetic steel 42 and the magnetic pole core 43 and an inner wall of the U-yoke 41. The above-mentioned central through-hole 111 is opened at the center of the frame bottom 11, an upper end of the U-yoke 41 of the central magnetic driving system 4*a* is fixedly arranged within the central through-hole 111, the neodymium magnetic steel 42 and the magnetic pole core 43 are mounted within the U-yoke 41, the lower surface of the magnetic pole core 43 is tightly fitted with the upper surface of the neodymium magnetic steel 42, the lower surface of the neodymium magnetic steel 42 is tightly fitted with the upper surface of the bottom of the U-yoke 41, and there is a gap between the outer surfaces of the magnetic pole core 43 and the neodymium magnetic steel 42 and the inner side surface of the U-yoke 41, thus forming a magnetic gap into which the central voice coil 31 is inserted. The above-mentioned plurality of peripheral through-holes 112 is distributed evenly around the central through-hole 111, upper ends of the U-yokes 41 of the respective outer magnetic driving systems 4*b* are fixedly arranged within the corresponding peripheral through-holes 112, the neodymium magnets 42 and the magnetic pole cores 43 are mounted within the U-yokes 41, the lower surfaces of the magnetic pole cores 43 are tightly fitted with the upper surfaces of the neodymium magnets 42, the lower surfaces of the neodymium magnets 42 are tightly fitted with the upper surfaces of the bottoms of the U-yokes 41, and there are gaps between the outer surfaces of the magnetic pole cores 43 and the neodymium magnets 42 and the inner side surfaces of the U-yokes 41, thus forming magnetic gaps into which the outer voice coils 32 are inserted. Preferably, the frame 1 is formed by plastic injection molding, and the U-yokes 41 are embedded within the frame 1 during the injection molding process, which improves the combination accuracy.

As shown in FIG. 2 and FIG. 3, each of the central voice coil 31 and the respective outer voice coils 32 has a pair of leads 33. An end portion of each lead 33 is connected with one inputting terminal 34 that is embedded on the outer part 13. Specifically, each voice coil is provided with 1 group of positive and negative leads 33, and each group of leads 33 are connected to two inputting terminals 34 on the outer part 13. When it is needed to connect the loudspeaker to a power amplifier, a male connector connected to the power amplifier can be inserted into a female connection port 131, to conduct the inputting terminals 34 therein, and to achieve the transmission of audio signals. The outer surface of the outer part 12 is provided with a plurality of outlet slots 121, and each inputting terminal 12 corresponds one outlet slot 121, to hold a wire for connecting the inputting terminal 34 with the outside. By inputting multiple analog audio signals or multiple digital audio signals to the central voice coil 31 and the respective outer voice coils 32 by the plurality of inputting terminals 34, the sound reproduction performance of the loudspeaker is improved.

A fixing step is formed on a lower surface of the central cone 21 to connect to the central voice coil 31, and the upper end of the central voice coil 31 is tightly fitted with the fixing step. A plurality of fixing steps are formed on lower surface of the outer cone 22 to connect to the outer voice coils 32, and the upper ends of the outer voice coils 32 are tightly fitted with the fixing steps.

The material of the above-mentioned frame 1 is plastic or metal material. The central cone 21 and the outer cone 22 are made of different materials, such as plastic (PP), cloth (silks), metal or alloy (aluminum alloy), and can be a film-like material. The edge rings 221 are made of the same material as the outer cone 22, or sponge, rubber, cloth or combinations thereof. They have the advantages of light weight, good damping elasticity and rigidity, high and low temperature resistance, waterproof and mold-proof.

The small loudspeaker of this embodiment has the following characteristics: by providing the central cone 21 with the spherical dome in the center of the frame 1, providing the step for fixing the voice coil at the lower end of the central cone 21, and fixing the central voice coil 31 on the fixing step of the central cone 21, a vibration system for the midrange and treble sound production is formed; another outer cone 22 with a flat main body is provided at the periphery of the central cone 21, the inner side edge and outer side end of the outer cone 22 are provided with the edge rings, the bottom of the outer cone 22 is provided with more than three evenly distributed steps for fixing the voice coils to fix the three outer voice coils on the steps of the outer cone 22, and to form a vibration system for bass and midrange sound production, thus forming a dual-cone multi-magnetic circuit loudspeaker without a damper. Such a loudspeaker adopts a dual-cone, multi-magnetic circuit and multi-voice coil drive structure, and when compared with the traditional loudspeaker without a damper, two cones is used, that is, the central cone 21 undertakes the midrange and treble sound production, the outer cone 22 undertakes the bass and midrange sound production, the combination of two cones is conducive to improving the sound reproduction clarity of the loudspeaker, and the bass and directional width of the loudspeaker is also better than that of the loudspeakers with traditional cones; by using a single-channel signal input to drive the central voice coil 31 to move up and down in the magnetic circuit of the U-yoke 41, and by using a multi-channel signal input to drive the plurality of voice coils to move up and down in the magnetic circuits of the plurality of U-yokes 41, the center cone 21 and the flat plate-shaped outer cone 22 are pushed to sound, the sensitivity of the loudspeaker may be increased, and the distortion of the loudspeaker may be reduced.

The small loudspeaker has an ingenious and reasonable product structure, and the central cone 21 (plane or spherical) is promoted to sound by inputting an audio signal to the central voice coil 31 to vibrate up and down in the central magnetic driving system; the outer cone 22 is promoted to sound by inputting multi-channel audio signals to the plurality of outer voice coils 32 to vibrate up and down in the outer magnetic driving systems. The central cone 21 adopts a plane shape or a spherical dome at the center to emit midrange and treble sound, and the outer cones 22 of a plane shape increase and expand the bass performance of the loudspeaker, broadens the frequency bandwidth and directivity of the loudspeaker, and reduces the distortion of the loudspeaker; through the combination of the central voice coil 31 and the plurality of outer voice coils 32, and through driving the two cones by the central magnetic driving system 4*a* and the outer magnetic driving systems 4*b*, the sensitivity of the loudspeaker is increased; the central cone 21 adopts a plane or spherical structure, and the outer cone adopts a flat-plate shape and inner and outer edge rings, so that the height of the cones are reduced, thus reducing the height of the product; by inputting multi-channel audio signals into the central voice coil 31 and the outer voice coils respectively, the central cone 21 and the outer cones are promoted, which can improve the sound reproduction effect of the loudspeaker. At the same time, the product has a compact structure, effectively utilizes space, and has a small overall volume that can be used as a small loudspeaker, making assembly and use more convenient.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

What is claimed is:

1. A dual-cone loudspeaker comprising:

a frame;

a cone assembly arranged on the frame, comprising a central cone and an outer cone;

a central driving mechanism for driving the central cone to vibrate; and a plurality of outer driving mechanisms for driving the outer cone to vibrate;

wherein, the outer driving mechanisms are arranged around the central driving mechanism, the central driving mechanism comprises a central voice coil connected to the central cone, and a central magnetic driving system for driving the central voice coil, and each of the plurality of outer driving mechanisms comprises an outer voice coil connected to the outer cone, and an outer magnetic driving system for driving the outer voice coil; when viewing from the top, the central cone is circular, and the outer cone is a ring surrounding the central cone.

2. The loudspeaker according to claim 1, wherein the frame comprises a frame bottom, and an inner flange extending upwards from the frame bottom, and an outer edge of the central cone is fixedly connected to the inner flange.

3. The loudspeaker according to claim 2, wherein the frame further comprises an outer part extending upwards from the frame bottom, the outer part surrounds the inner flange, the outer cone is in a ring shape with an inner edge and an outer edge, the inner edge of the outer cone is fixedly connected to the inner flange, and the outer edge of the outer cone is fixedly connected to the outer part.

4. The loudspeaker according to claim 1, wherein the frame further comprises a frame bottom, an inner flange and an outer part extending upwards from the frame bottom, the outer part surrounds the inner flange, an outer edge of the central cone is fixedly connected to the inner flange, the outer cone is in a ring shape with an inner edge and an outer edge, the inner edge of the outer cone is fixedly connected to the inner flange, and the outer edge of the outer cone is fixedly connected to the outer part.

5. The loudspeaker according to claim 2, wherein the central magnetic driving system and the outer magnetic driving systems are fixedly arranged on the frame bottom, and the central voice coil and the outer voice coils are located between the cone assembly and the frame bottom.

6. The loudspeaker according to claim 5, wherein the central magnetic driving system and the outer magnetic driving systems are fixedly arranged below the frame bottom, the frame bottom is opened with a central through-hole and a plurality of peripheral through-holes, a lower end of the central voice coil is inserted into a magnetic gap of the central magnetic driving system through the central through hole, and a lower end of the outer voice coil is inserted into a magnetic gap of one of the outer magnetic driving systems through one of the peripheral through-holes.

7. The loudspeaker according to claim 5, wherein the frame bottom is substantially in a shape of flat plate.

8. The loudspeaker according to claim 5, wherein each of the central magnetic driving system and the outer magnetic driving systems comprises a U-yoke having a cavity, and a magnetic steel and a magnetic pole core arranged within the U-yoke, an upper end of the U-yoke is fixedly connected to the frame bottom, and a magnetic gap into which the central voice coil or one of the outer voice coils is inserted is formed between the magnetic steel and the magnetic pole core and an inner wall of the U-yoke.

9. The loudspeaker according to claim 5, wherein each of the central voice coil and the outer voice coils has a pair of leads, an end portion of each of the leads is connected with one inputting terminal that is capable of being electrically connected to a power amplifier, and the inputting terminal is embedded on a lower surface of the frame bottom.

10. The loudspeaker according to claim 1, wherein a central part of the central cone has an upward arched spherical dome, and the outer cone has a flat plate-shaped main body.

11. The loudspeaker according to claim 1, wherein a fixing step is formed on a lower surface of the central cone to connect to the central voice coil.

12. The loudspeaker according to claim 1, wherein a plurality of fixing steps are formed on a lower surface of the outer cone to connect to the outer voice coils.

13. The loudspeaker according to claim 1, wherein the plurality of outer driving mechanisms are arranged around the central driving mechanism at equal intervals.

* * * * *